| United States Patent [19] | [11] | 4,430,369 |
|---|---|---|
| Payne | [45] | Feb. 7, 1984 |

[54] SILICA SOL PENETRATION AND SATURATION OF THERMAL INSULATION FIBERS

[75] Inventor: Charles C. Payne, Aurora, Ill.

[73] Assignee: Nalco Chemical Company, Oak Brook, Ill.

[21] Appl. No.: 383,720

[22] Filed: Jun. 1, 1982

[51] Int. Cl.³ .......................... B05D 3/02; B01J 13/00
[52] U.S. Cl. ............................ 427/397.7; 106/287.34; 252/313 S
[58] Field of Search ................ 106/287.34; 427/397.7; 423/335; 252/313 S

[56] References Cited

U.S. PATENT DOCUMENTS

| 3,077,413 | 2/1963 | Campbell | 106/38.27 |
|---|---|---|---|
| 3,320,082 | 5/1967 | McMahon et al. | 106/287.34 |
| 3,650,777 | 3/1972 | Schneble et al. | 427/437 X |
| 4,321,243 | 3/1982 | Cornwell et al. | 423/335 X |

Primary Examiner—Michael R. Lusignan
Attorney, Agent, or Firm—John S. Fosse

[57] ABSTRACT

Chemical complexing compounds such as salts of aminotrimethylene phosphonic acid or ethylenediamine tetracetic acid are added to alkali-stabilized silica sols in order to promote rapid and complete re-saturation of alumino-silicate fiber insulation previously formed and dried using colloidal silica products.

5 Claims, No Drawings

SILICA SOL PENETRATION AND SATURATION OF THERMAL INSULATION FIBERS

FIELD OF THE INVENTION

This invention relates generally to the manufacture of discrete insulation products for use in high-temperature service and, more particularly, to such products that are fabricated by vacuum-forming mats of ceramic fibers which have been prepared from a water suspension of finely divided silica particles.

BACKGROUND OF THE INVENTION

Refractory products taking such configurations as board and various special shapes have been manufactured heretofore from alumino-silicate ceramic fibers impregnated with colloidal silica for use as high-temperature furnace insulation and the like. According to conventional practice, ceramic fibers comprising silica and from about 45 to about 55% alumina are selected to have a mean diameter of about 2 to 3 microns with random lengths ranging from about 1½ to about 3 inches. The fibers are slurried with dilute colloidal silica and then vacuum-formed using a mesh mold in order to create a board or other shape. Colloidal silica solutions for use in this process comprise water suspensions and commonly contain from about 15 to about 30% hydrophilic silica particles having a mean diameter ranging between 4 and about 75 millimicrons.

During the vacuum-forming step, part of the colloidal silica sol is withdrawn from the ceramic fiber mat. The fibers are ordinarily slurried initially at a rate of 300 to 400 grams of the dilute silica sol per 100 grams of fiber. Semi-finished products from the vacuum-forming operation are dried in a forced-air oven from 4 to 24 hours at from about 105° to about 500° C.

A serious problem exists with respect to these colloidal silica-loaded, ceramic fiber mats in that the silica particles tend to migrate with the water vehicle during the drying step, leaving crust-like surface layers and a soft, comparatively unimpregnated center. Moreover, the crusty surface layers resist penetration by any subsequently attempted infusion with the silica sol. Accordingly, optimum breaking strengths have not heretofore been obtained.

The incorporation of a surfactant in the silica sol has been proposed in the past in an effort to enhance penetration of secondary infusions; but the addition of such common wetting agents as polyethylene glycol ethers, ammonium lauryl sulfates, and various polyoxyalkylene copolymers have exhibited definitely negative effects, actually inhibiting penetration of the sol in practice.

SUMMARY OF THE INVENTION

The present invention overcomes the limitations of the prior art by incorporating chemical complexing compounds of unsuspected utility in the silica sols which are employed for secondary infusion of vacuum-formed ceramic fiber mats. In particular, the present invention contemplates the addition of small amounts of such complexing compounds as aminotrimethylene phosphonic acid products or ethylenediamine tetracetic acid salts to such silica sols. As a result, rapid and complete re-saturation of the fiber mats has been achieved.

Accordingly, a general object of the present invention is to provide a new and improved method of making silica-charged ceramic fiber insulation bodies, and compositions for use in such methods.

DETAILED DESCRIPTION OF THE INVENTION

The present invention is based on the discovery that chemical compounds which normally are considered to be complexing agents act in an unsuspected manner to promote infusion of colloidal silica suspensions into pre-treated mats of alumino-silicate fibers; and while it is not desired to be limited to any particular theory, it is believed that the complexing compounds of the instant invention result in a surface tension plus charge-related effect in the alkali-stabilized colloidal silica suspension whereby to promote re-saturation. More specifically, the complexing compounds of the invention comprise the partial condensation products of a higher substituted aliphatic amine, such as a secondary or tertiary aliphatic amine, and an acid selected from the group consisting of phosphonic acid and aliphatic acids containing from 1 to 6 carbon atoms, together with the alkali metal salts of such reaction products. Such complexing compounds as ethylenediamine tetracetic acid tetrasodium salt, aminotrimethylene phosphonic acid, aminotrimethylene phosphonic acid pentasodium salt, ethylenediamine tetramethylene phosphonic acid hexapotassium salt, and diethylenetriamine pentamethylene phosphonic acid have proved eminently useful in the practice of the present invention.

The specifically selected complexing compound is added to an alkali-stabilized, water suspension of colloidal silica in comparatively small, surface active amounts of from about ½% to about 4% by weight. Advantageously, the silica sol is alkali-stabilized to a pH of no less than about 8.5.

In order to describe the invention more fully, the following specific examples are given without, however, intending to limit the invention to the precise details and conditions set forth:

WORKING EXAMPLES

In order to determine the effectiveness of various additive compositions in achieving saturation of a pre-treated mat of alumnino-silicate fibers, a suspension of colloidal silica in water was first prepared. The finely divided silica powder particles were selected to have an average size of 15 nanometers, and the resultant water suspension was stabilized with sodium hydroxide to a pH of 9.7±0.01 and with a total solids content of 40%.

Mats of the alumino-silicate fibers described hereinabove were prepared to measure 5 cm.×5 cm.×1.3 cm. by vacuum-forming from a slurry containing 22% silica as the sol specified in the preceding paragraph. These test mats were dried at about 600° F. and thereafter redipped in the silica sol into which various additive compositions had been incorporated at selected levels. The results were as follows:

| MATERIAL TESTED | CHEMISTRY OF MATERIAL TESTED | WT. % ADDED | SATURATION TIME |
| --- | --- | --- | --- |
| unmodified silica suspension | — | none | 12 secs. |
| Pluronic L-35 | PO/EO copolymer | 2.0% | 28 secs. |

-continued

| MATERIAL TESTED | CHEMISTRY OF MATERIAL TESTED | WT. % ADDED | SATURATION TIME |
|---|---|---|---|
| (HLB = 18.5) Pluronic L-62 | (BASF Wyandotte) PO/EO copolymer | 2.0% | 31 secs. |
| (HLB = 7.0) Pluronic L-63 | (BASF Wyandotte) PO/EO copolymer | 2.0% | 34 secs. |
| (HLB = 11.0) 15S-40 | BASF Wyandotte) PEG Ether (Union Carbide) | 2.0% | 150 secs. |
| Span 85 (HLB = 1.8) | Sorbitol trioleate (ICI-America) | 2.0% | 28 secs. |
| Emersal 6430 | Ammonium lauryl sulfate (Emery Industries) | 2.0% | 17 secs. |
| EDTA-Na | Ethylenediamine tetracetic acid tetrasodium salt | 0.5% | 6 secs. |
| Dequest 2000 | Aminotrimethylene phosphonic acid (Monsanto) | 0.5% | 5 secs. |
| Dequest 2006 | Aminotrimethylene phosphonic acid pentasodium salt | 0.5% | 6 secs. |
| Dequest 2044 | Ethylenediamine tetramethylene phosphonic acid hexapotassium salt | 0.5% | 6 secs. |
| Dequest 2060 | Diethylenetriamine pentamethylene phosphonic acid | 0.5% | 5 secs. |
| Conco Sulfate | Ammonium lauryl ether sulfate (Continental Chemical) | 0.5% | 17 secs. |
| Conco Sulfate | Ammonium lauryl ether sulfate (Continental Chemical) | 1.0% | 18 secs. |
| Conco Sulfate | Ammonium lauryl ether sulfate (Continental Chemical) | 2.0% | 15 secs. |
| Conco Sulfate | Ammonium lauryl ether sulfate (Continental Chemical) | 4.0% | 19 secs. |
| Aliquat 284 | Dimethyldilauryl ammonium chloride (General Mills) | 2.0% | Not Compatible |

Examination of the foregoing data points out the effectiveness of the instant complexing compounds and the negative results of conventional surfactants.

While specific descriptions of the invention have been given, it should be understood, of course, that the invention is not limited thereto since many modifications may be made; and it is, therefore, contemplated to cover by the present application all such modifications as fall within the spirit and scope of the appended claims.

The invention is claimed as follows:

1. In a process of manufacturing discrete, ceramic fiber insulation products wherein alumino-silicate fibers are first mixed into a slurry with colloidal silica and then formed into a mat which is thereafter dried, the steps of: providing an alkali-stabilized water suspension of colloidal silica; incorporating in said suspension a surface active amount of a complexing compound comprising the partial condensation product of a higher substituted aliphatic amine and an acid selected from the group consisting of phosphonic acid and aliphatic acids containing from 1 to 6 carbon atoms; and infusing said modified suspension throughout said pre-treated mat of alumino-silicate fibers.

2. In the process according to claim 1 wherein said suspension has a pH number of at least 8.5.

3. In the process according to claim 1 wherein said complexing compound is an alkylaminophosphonic acid compound.

4. In the process according to claim 1 wherein said compound is an alkali metal salt of an alkylaminophosphonic acid.

5. In the process according to claim 1 wherein said complexing compound is a sodium salt of ethylenediamine tetraacetic acid.

* * * * *